Sept. 27, 1932.    C. R. SMITH ET AL    1,879,828
MIXING APPARATUS
Filed April 2, 1931    3 Sheets-Sheet 1

INVENTORS,
Clifford Ross Smith,
Alfred Bartlett Smith.
BY THEIR ATTORNEY,
Andrew Wilson.

Sept. 27, 1932.  C. R. SMITH ET AL  1,879,828
MIXING APPARATUS
Filed April 2, 1931  3 Sheets-Sheet 3
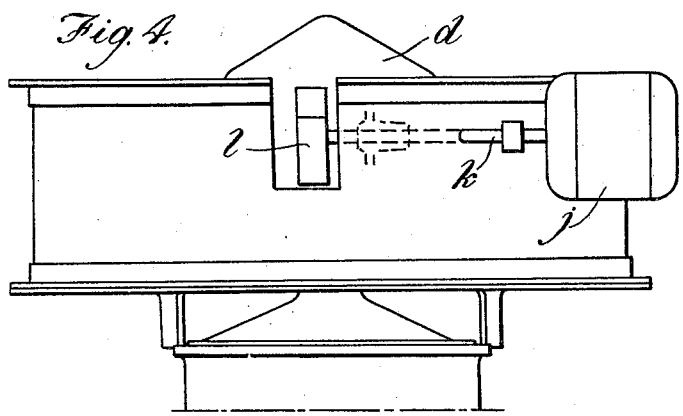
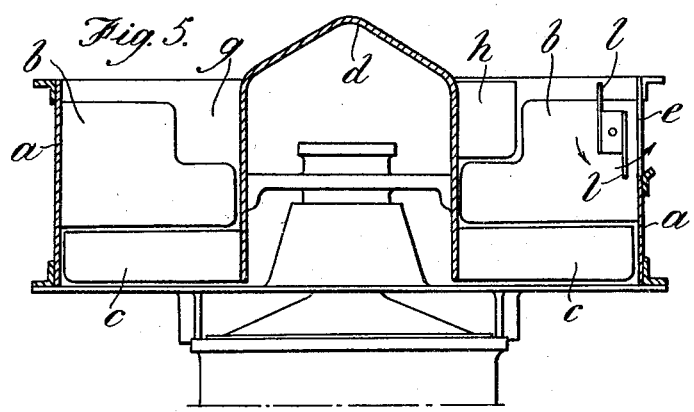
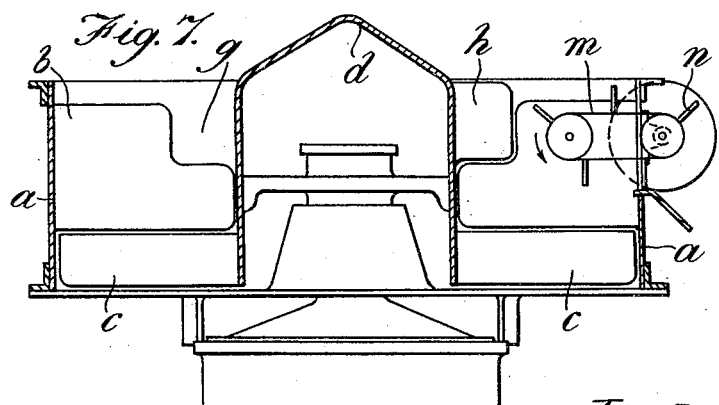
INVENTORS.
Clifford Ross Smith,
Alfred Bartlett Smith,
BY THEIR ATTORNEY Patented Sept. 27, 1932

1,879,828

UNITED STATES PATENT OFFICE

CLIFFORD ROSS SMITH AND ALFRED BARTLETT SMITH, OF WOLVERHAMPTON, ENGLAND

MIXING APPARATUS

Application filed April 2, 1931, Serial No. 527,110, and in Great Britain April 10, 1930.

This invention relates to improvements in mixing apparatus and refers particularly to apparatus for mixing foundry sand and like materials.

Most sand mixers and sand-mills at present in use are intermittent in their operation, a batch of material of the required amount being fed into the machine, mixed, and removed before the next batch is fed in, although some mixers or mills are so arranged that material is drawn off continuously but in such cases careful and constant regulation of the feed and discharge are necessary to ensure that the machine shall not be overloaded or become so nearly empty that the mixing ceases to be efficient.

In modern foundries, and particularly in foundries where repetition castings are made in large numbers it would be a great advantage to have an efficient continuous sand mixer, and the object of our invention is to provide a continuously acting mixing machine which requires no attention other than the setting of the feed to give the required output within the capacity of the machine and which ensures that only effectively mixed material can pass from the outlet.

Our invention consists in arranging for the material fed into a mixing machine or mill to displace continuously some of the mixed or partially mixed material passing through the machine and fully mixed material is caused to heap up at one or more points from which it is continuously discharged through a suitably placed outlet, either automatically by overflowing from the outlet, or mechanically by any suitable means. The rate of discharge from the outlet will be equivalent to the rate of feed so that the mean amount of material in the machine at any given moment is substantially constant, and the output from the machine is controlled solely by the rate of feed. A higher rate of feed increases the mean effective depth of material in the machine and therefore the rate of escape of mixed material through the outlet or overflow and similarly a reduced rate of feed reduces the effective depth of material in the machine and hence the effective area of the outlet.

In a pan type mixer or mill the outlet is conveniently arranged at one side of the machine immediately behind (in the sense of rotation) the feed so that no material can pass from the feed to the outlet without having been carried round at least once. Normally of course only fully mixed material can leave the machine as the fresh material is fed in at such a point that it must pass many times round the machine before reaching the outlet.

In the case of a mixer of the type divided into compartments by stationary blades or pressure surfaces and having rotating blades or sweeps which carry the material past the fixed blades the fresh material may be fed into the compartment in front of one fixed blade or pressure surface and the mixed material is discharged through an outlet in the side of the pan on the rear side of the same fixed blade. A certain proportion only of the material is carried from one compartment to the next by the passage of each rotating blade and a part of each stationary blade at its inner edge on the upper side is cut away to form a part annular channel through which blades or arms on a central rotating dome or cap carry excess material from one compartment to the next.

Some practical forms of our invention as applied to a mixing machine of the type described in the specification of our Patent No. 1,751,221 are illustrated diagrammatically by way of example in the accompanying drawings in which:—

Figure 3 is a plan and Figures 4 and 5 are transverse vertical sections at right angles to each other of a modification in which a mechanical discharging device is employed.

Figures 6 and 7 are a plan and transverse vertical section respectively showing an alternative form of mechanical discharging device.

Figure 1:
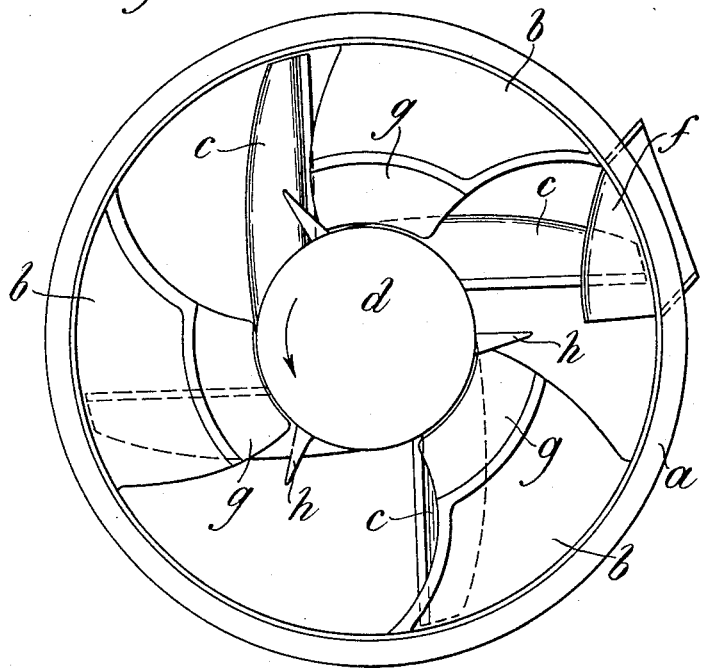
Figure 1 is a plan and Figure 2 is a transverse vertical section of a mixing machine in which the discharge of the mixed materials is effected automatically.
Figure 2:
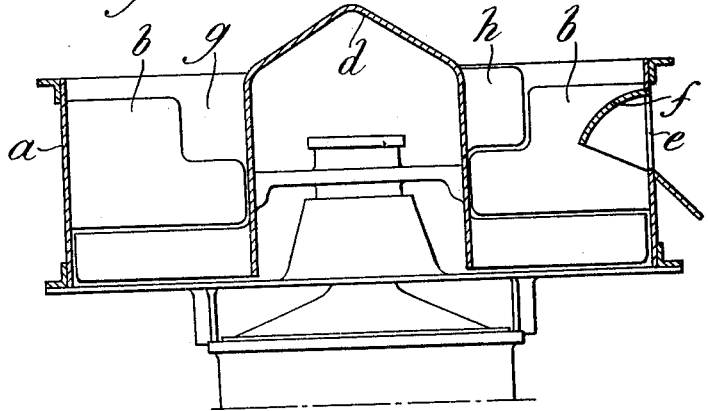

In all the figures of the drawings $a$ is the pan of the mixer which is of shallow cylindrical form, $b\ b$ are stationary fixed blades or pressure surfaces, and $c$ $c$ are rotating blades or sweeps adapted to co-operate with the pressure surfaces and carried by a central rotating dome or cap $d$ which is driven in the usual way. The fixed pressure surfaces divide the pan into three compartments and a discharge opening $e$ provided with a curved deflector plate $f$ is formed in the outer wall of one compartment. The material is fed in any convenient manner, as for example by a conveyor or shoot, into the next compartment in front of (in the sense of rotation) the compartment in which the discharge opening is located.

The pressure surfaces are of substantial dimensions and extend from the periphery of the pan to the central dome or cap and the moving blades press the material to be mixed outwardly and upwardly and squeeze it against the pressure surfaces which tend to direct the material inwardly and downwardly. As each blade passes beneath each pressure surface it carries a certain substantially constant proportion of the material with it from one compartment to the next but the blades cannot cope with an excess of material fed into the first compartment. To deal with this a part of each pressure surface at its inner edge on the upper side is cut away to form a part annular channel $g$ and blades or arms $h$ secured to and projecting radially from the central dome or cap travel round through these channels to carry any excess of material in one compartment over to the next. These arms may be flexibly mounted if the pressure surfaces are capable of rising to clear obstructions.

In practice there is a point in each compartment where the bottom of the pan is kept clear or nearly clear of material by the blades and the fresh material is conveniently fed into the first compartment at this point. Any suitable means may be employed for putting the fresh material into the compartment; all that is necessary being to deliver the material through the open top of the mixer into that part of the compartment from which the mixture has been pushed forward by the passage of a mixing blade. The fresh material may be put in by hand, or by a traveling conveyor or other well known means which will drop it at the desired point. I have thought it to be unnecessary, therefore, to illustrate any special feeding means. The fresh material is thus delivered to the bottom of the compartment and the accumulation of material displaces partially mixed material in an upward direction until the uppermost part of it rises above the level of the bottom of the channel $g$ in the next pressure surface and is transferred by the rotating arms $h$ into the next compartment to the bottom of which it falls. These arms $h$ act in effect as automatic balancing or compensating blades regulating the volume of material in each compartment.

The same operation takes place in the next compartment and when material enters the compartment in which the discharge outlet is located some of the mixed material already in the compartment is displaced upwardly so that it leaves the pan through the outlet. The amount of material taken from each compartment by each of the main mixing blades $c$ as it passes through is substantially the same as that brought in by the next blade so that the amount of material transferred by the arms $h$ from each compartment to the next and finally discharged is just equal to the amount of fresh material fed into the first compartment during each rotation of the arms.

Provided the rate of feed is uniform the rate of discharge will also be substantially uniform and the machine may feed the discharged material directly on to one or more conveyors supplying moulding machines or other apparatus.

The deflector plate $f$ and the opening $e$ may be made adjustable if desired to regulate the height to which the material is allowed to accumulate before discharging commences and hence to control the mean depth of material in the pan.

Figure 3:
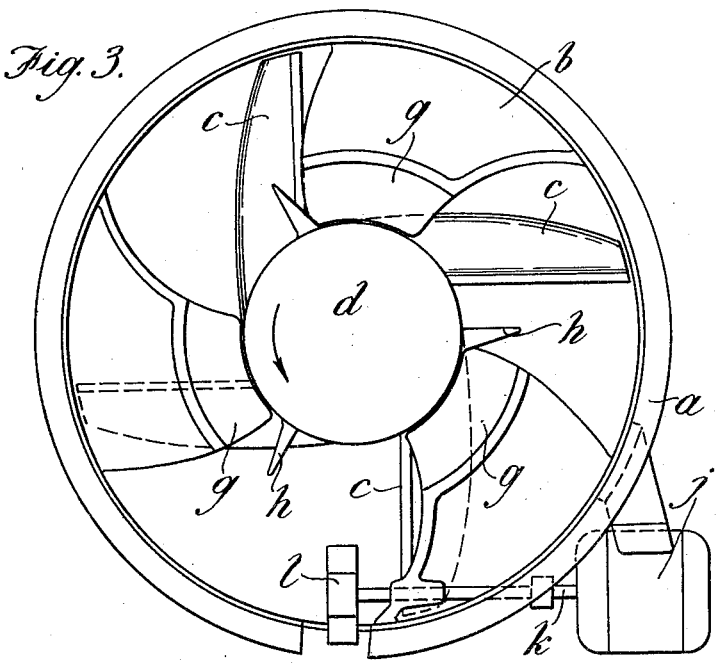

Figures 3, 4 and 5 illustrate diagrammatically one convenient mechanical means for discharging the material from the pan. An electric motor $j$ or other convenient power driving means drives a spindle $k$ on the free end of which is located a head carrying blades $l$ which are located in an opening in the side of the pan and project into the last compartment.

These blades rotating at high speed engage the mixed material which heaps up in the last compartment and throw it radially outwards from the pan so that it is thoroughly broken up and aerated as it is discharged.

Figure 6:
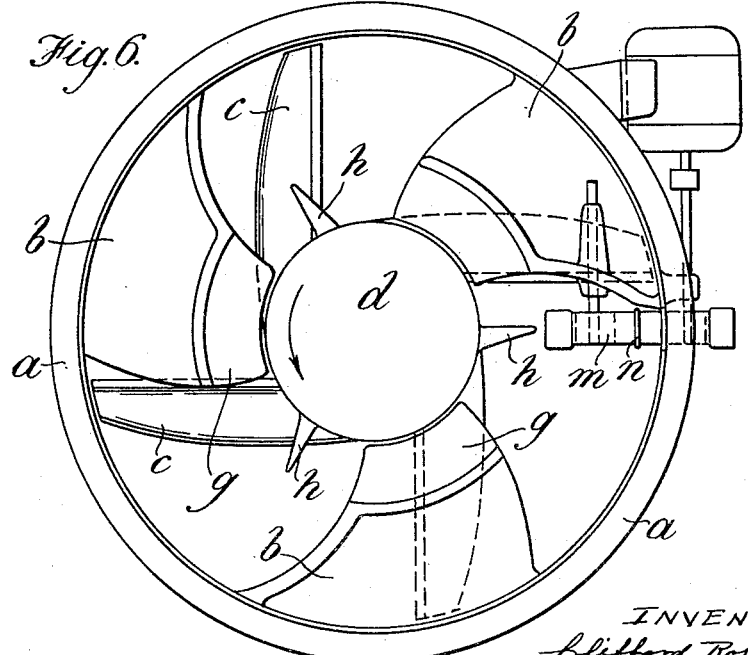

In the alternative arrangement illustrated diagrammatically in Figures 6 and 7 a driven belt $m$ projecting radially through an opening in the wall of the pan into the last compartment carries projecting plates or fingers $n$ which engage the mixed material as it heaps up in the compartment and throws the material outwardly in a continuous stream.

Any other equivalent mechanical means of discharge may be employed.

We claim:

1. Apparatus for mixing foundry sand, or other comminuted materials, comprising a container into which material may be continuously fed, means for agitating the material in the container, means for causing completely mixed material to heap up in waves above incompletely mixed material and above the normal level of the mass, means for carrying off completely mixed material from the crests of the waves, and means for retaining and further mixing the incompletely mixed material.

2. Apparatus for mixing foundry sand, and other comminuted materials, comprising a container adapted to be continuously fed with materials to be mixed and provided with a lateral discharge opening and with a plurality of circumferentially spaced fixed means, means rotatably mounted below the fixed means and cooperating therewith adapted to cause waves of completely mixed material to heap up in advance of the fixed means and above the normal level of the material and the incompletely mixed portions thereof, and means for continuously carrying off only completely mixed material from the crests of the waves through the discharge opening.

3. Apparatus for mixing foundry sand or other comminuted materials, comprising a container into which material may be continuously fed, rotary means for mixing the material in the container, a plurality of stationary means within the container beneath and against which the material is carried by the rotating means and whereby the completely mixed material is caused to rise up in waves above the normal level of the material and the incompletely mixed material in the container, and a discharge device disposed above and out of the plane of the rotary means and in the plane of the wave crests to carry off material from such crests at a rate equivalent to the rate of feed.

4. Apparatus for mixing foundry sand or other comminuted materials comprising a container into which material may be fed continuously, a plurality of rotary means for mixing the material in the container, stationary means past and against which the material is carried by the rotary means and whereby the completely mixed material is caused to heap up at certain points in the container in waves above the normal level of the material in the container and the incompletely mixed material, and a discharge device arranged out of the plane of the rotary mixing means, said discharge device being arranged to engage the crests of the waves of fully mixed material and to carry them off at a rate equivalent to the rate of feed.

5. Apparatus for mixing foundry sand or other comminuted materials comprising a cylindrical container, a plurality of stationary blades dividing said container into compartments into one of which fresh material may be fed continuously in advance of one of such blades, rotating blades travelling below the stationary blades and adapted to carry material through the compartments successively, a discharge opening in the side of the container at the rear of the last mentioned stationary blade, and means for discharging mixed material continuously through said opening.

6. Apparatus for mixing foundry sand or other comminuted materials comprising a cylindrical container, a plurality of stationary blades dividing said container into compartments into one of which fresh material may be introduced continuously in advance of a stationary blade, rotating blades travelling below the stationary blades and adapted to carry material through the compartments successively, openings in the upper parts of said stationary blades, rotating arms travelling through said openings and adapted to carry an excess of material in one compartment from that compartment to the next through said openings, and means for continuously withdrawing from the compartment at the rear of the stationary blade before which the fresh material may be introduced mixed material which is heaped up in said compartment by the action of the apparatus.

7. Apparatus for mixing foundry sand or other comminuted materials, comprising a cylindrical container into which fresh material may be introduced continuously, rotary means for mixing the material in the container, means for causing completely mixed material to heap up at certain points in waves above the normal level of the material in the container and above the incompletely mixed material, an opening in the side of the container adjacent to one of said points, and a deflector plate attached to and projecting inwardly from one side of the container for deflecting through said opening the heaped up mixed material.

8. Apparatus for mixing foundry sand or other comminuted materials, comprising a cylindrical container into which fresh material may be introduced continuously, rotary means for mixing the material in the container, a plurality of means for causing completely mixed material to heap up at certain points in waves above the normal level of the material and the incompletely mixed material in the container, an opening in the side of the container adjacent one of said points, and rotating means for engaging the heaped up material at the crests of the waves and moving the material outwardly through said opening.

CLIFFORD ROSS SMITH.
ALFRED BARTLETT SMITH.